United States Patent [19]

Bess, Jr. et al.

[11] Patent Number: 5,753,098
[45] Date of Patent: May 19, 1998

[54] CYLINDRICAL ELECTROLYZER ASSEMBLY AND METHOD

[75] Inventors: James W. Bess, Jr., Sugarland; Charles W. Clements, Sr., League City; John F. Newman, III, Katy, all of Tex.

[73] Assignee: Excel Technologies International Corp., Sugar Land, Tex.

[21] Appl. No.: 635,823

[22] Filed: Apr. 22, 1996

[51] Int. Cl.[6] .................. C25B 1/24; C25B 9/00; C25B 11/02; C25B 15/08
[52] U.S. Cl. .................. 205/501; 204/269; 204/271; 204/272; 204/279; 204/290 R; 204/290 F; 204/292; 204/293; 204/294; 29/592.1
[58] Field of Search .................. 204/272, 275, 204/289, 269, 290 F, 290 R, 292, 293, 280, 297 R, 271; 205/500, 501; 29/592.1

[56] References Cited

U.S. PATENT DOCUMENTS

| | | | |
|---|---|---|---|
| 1,440,091 | 12/1922 | Long | 204/272 |
| 3,076,754 | 2/1963 | Evans | 204/237 |
| 3,265,526 | 8/1966 | Beer | 117/50 |
| 3,282,823 | 11/1966 | Richards | 204/272 |
| 3,390,065 | 6/1968 | Cooper | 205/501 X |
| 3,632,498 | 1/1972 | Beer | 204/290 F |
| 3,711,385 | 1/1973 | Beer | 204/59 |
| 3,718,540 | 2/1973 | Bailey | 204/272 |
| 3,873,438 | 3/1975 | Anderson et al. | 204/268 |
| 3,984,303 | 10/1976 | Peters et al. | 204/260 |
| 4,528,084 | 7/1985 | Beer et al. | 204/290 F |
| 4,612,104 | 9/1986 | Holmes et al. | 204/272 |
| 4,744,877 | 5/1988 | Maddock | 204/271 X |
| 4,804,452 | 2/1989 | Rhodes | 204/238 |
| 5,102,515 | 4/1992 | Ibbot | 204/150 |
| 5,427,667 | 6/1995 | Bakhir et al. | 204/260 |

FOREIGN PATENT DOCUMENTS

| | | |
|---|---|---|
| 422994 | 4/1991 | European Pat. Off. . |
| 615003 | 9/1994 | European Pat. Off. . |
| 550258 | 12/1942 | United Kingdom . |
| WO91/07525 | 5/1991 | WIPO . |

OTHER PUBLICATIONS

International Search Report re PCT/US 97/05102, dated Jul. 10, 1997 Applicant: ELTECH Systems Corporation.

*Primary Examiner*—Donald R. Valentine
*Attorney, Agent, or Firm*—John J. Freer

[57] ABSTRACT

An electrolyzer assembly has an outer, cylindrical dielectric electrolyzer housing member having a top, bottom, and cylindrical side wall. In one embodiment, the housing member has a sealed top, an open bottom for electrolyte entry, and apertures through the side wall near the sealed top permitting flow of electrolyte through the apertures. A cylindrical anode and cathode pair is situated inside the housing member. The cathode is positioned concentrically within the anode. Electrolyte flows in the space between anode and cathode. The anode is spaced apart from the side wall, providing an electrolyte flow path through the resulting cylindrically-shaped space. Electrical connections through the top of the housing member extend downwardly therein to electrical connection elements projecting upwardly from the electrode pair. The assembly provides for ease of cleaning, as well as ease of refurbishing, and operates efficiently and economically in both forced and unforced flow conditions.

50 Claims, 7 Drawing Sheets

CYLINDRICAL ELECTROLYZER ASSEMBLY AND METHOD

BACKGROUND OF THE INVENTION

It has been useful for hypochlorite generation from sea water or other brine solutions, as for sewage treatment and disinfection, to provide on-site electrolyzer apparatus. The apparatus can include cells which have cylindrical electrodes that may be arranged concentrically or which may be positioned in a bipolar arrangement in parallel. In such cells, the electrodes are typically spaced closely apart and contained in a single housing member.

As representative of such apparatus, there has been disclosed in U.S. Pat. No. 3,076,754 apparatus consisting of cells useful in the production of sodium hypochlorite from brine. In the apparatus, coaxially positioned tubes are positioned vertically and firmly affixed in upper and lower blocks. The inner tube forms the cathode of the cell while the outer tube forms the anode. Separate water and brine feeds, as side streams, enter the lower block and are channeled within the cathode or between the anode and cathode. The streams combine in the top block and exit therefrom as a side stream mixture. A top metal bushing serves to provide electrical connection for the inner cathode and an outer clamp around the anode provides electrical contact to the anode.

For a teaching of cylindrical anode and cathode members in parallel with longitudinal spacing between the members, reference can be made to U.S. Pat. No. 3,873,438. These longitudinally spaced electrodes are coaxially spaced from a bipolar electrode and electrolyte such as brine flows through the annular flow passage between the bipolar electrode and the longitudinally spaced cylindrical anode and cathode with the apparatus thereby generating sodium hypochlorite.

It would be desirable to provide a hypochlorite generating electrolyzer that could operate efficiently under either forced flow conditions or evolved gas driven flow application, as discussed more fully hereinbelow. It would also be worthwhile to provide such an electrolyzer having outstanding reliability in such applications. It would further be desirable if the extended reliability could be coupled with improved cell performance for both forced and unforced flow conditions.

SUMMARY OF THE INVENTION

It has now been found that such objectives can be attained through the present invention. An electrolyzer for the production of hypochlorite has now been constructed which will operate efficiently under either forced flow conditions or evolved gas driven flow application. Forced flow conditions can be provided such as by pumping electrolyte through the apparatus. In applications where a gas such as hydrogen is generated in the electrolyzer, the evolution of the gas may be suitable to drive electrolyte circulation without benefit of further assistance, e.g., without electrolyte pumping. The apparatus exhibits extended reliability and improved cell performance for both the forced as well as the unforced flow condition. Furthermore, the apparatus has increased cell performance and efficiency that can be combined with ready portability of the apparatus as well as ease of assembly cleaning. Moreover, the ease of cleaning is coupled with ease of refurbishing assembly components.

In one aspect, the invention is directed to a portable and upright, cylindrical electrolyzer assembly having at least one unseparated cell with electrodes provided by one cylindrical anode and cathode pair, the assembly comprising:

an elongate, upright, cylindrical and hollow dielectric electrolyzer housing member having a top, a bottom, and a cylindrical side-wall member having inner and outer major cylindrical faces, with the side-wall member confining electrolyte in the housing member;

means for providing electrical connection within the housing member through the top;

means for admitting electrolyte to the housing member through the bottom;

an upright, cylindrical and hollow metal anode member having a non-perforate side-wall, such anode member being positioned concentrically inside the dielectric housing member and spaced apart therefrom, the anode member providing the anode of the anode and cathode pair, as well as providing with the housing member side-wall an annular electrolyte flow path outside the anode member side-wall and inside the housing member inner major face;

an upright and cylindrical metal cathode member having a non-perforate side-wall, which cathode member is the cathode of the anode and cathode pair and which cathode member is situated concentrically within the anode member and spaced apart therefrom, thereby providing an annular electrolyte flow path between the anode and cathode pair; and elongate electrical connector elements positioned axially within the housing member and extending from the top to the anode member and cathode member; whereby electrical current enters the housing member through the top and is conveyed through the electrical connector elements to the anode and cathode pair, and electrolyte enters the assembly at the bottom and flows upwardly through the annular flow path between the anode and cathode pair, as well as upwardly through the annular flow path outside the anode member and inside the housing member inner major face.

In another aspect, the invention is directed to an assembly as described hereinbefore further having a sealed top and an open bottom, with apertures through the side wall member near the sealed top serving as electrolyte outlet means, and with the side wall member being non-perforate below the apertures for confining electrolyte below the apertures.

In another aspect, the invention is directed to an electrolytic cell electrode adapted for use in a cylindrical electrolyzer, such electrode comprising:

a non-perforate, cylindrical and hollow, rigid metal electrode member having inner and outer cylindrical major faces; and an elongate, electrically conductive, rigid metal rod element securely affixed to an electrode major face, such rod element extending in an axial direction along a substantial length of the major face, while also projecting in an axial direction for a substantial length beyond the electrode member.

In a still further aspect, the invention is directed to a method of making a cylindrical electrolyzer assembly, which assembly has been described hereinbefore, which method comprises:

establishing an elongate, upright and cylindrical, dielectric electrolyzer housing member having open top and bottom ends;

providing a cylindrical electrode pair assembly as described hereinabove, with each electrode member of the electrode pair having an elongate electrical connector rigid rod element as described hereinabove;

establishing flexible and elongate electrical current conveying means;

coupling the flexible electrical current conveying means to the rigid rod elements of the electrode pair; and enclosing within the housing member the electrode pair assembly and the flexible and elongate current conveying means, positioning the electrode pair assembly therein for projecting the rigid rod elements toward the housing member top end, while substantially extending said current conveying means axially within the housing member.

In a still further aspect, the invention is directed to a method of refurbishing the hereinbefore described electrolyzer assembly, which method comprises:

unsealing a sealed top of the housing member;

removing the housing member from the assembly;

uncoupling the electrical current carrying means from metal rod elements for each electrode of the anode and cathode pair;

coupling elongate metal rod elements, from replacement anodes and cathodes, to the flexible electrical current carrying means; and replacing the electrolyzer housing member and securing the replacement electrode pair thereto; while returning the flexible electrical current carrying means to a position partially extending within the housing member.

In a yet further aspect, the invention is directed to a cylindrical anode and cathode pair assembly adapted for use in an unseparated cell, such assembly comprising:

a metal anode member as described hereinabove;

a cathode member as described hereinabove, which cathode member is situated concentrically within the anode member and spaced apart therefrom, thereby providing an annular electrolyte flow path between the anode and cathode pair;

rigid rod elements as described hereinbefore for each of the anode and the cathode;

a support plate member at each end of the anode and cathode pair, each plate member being firmly positioned against the electrode members; and fastening means pressing the support plate members into the firm contact with the electrode ends.

In another aspect, the invention is directed to an electrode holder adapted for insertion in a cylindrical and hollow housing member confining an electrolytic cell electrode therein, such electrode holder comprising a flow-through, planar member having at least substantially flat top and bottom surfaces and having an at least substantially solid center section with an aperture through the center of the section, such member having slotted elements extending from the center section, with slots that are in at least one of the substantially flat surfaces, with the aforesaid elements extending to the outer periphery of the member while providing porosity between the center section and the outer periphery.

The invention is also directed to an electrode assembly containing first and second cells spaced apart from one another, each comprising the above-described cylindrical anode and cathode, the cells being at least substantially coaxial and having electrolyte flowing through the cells and from the first cell to the second cell, and with the assembly further comprising:

an electrolyte flow diverter element situated between the cells, such diverter element having:

a first electrolyte flow channel diverting electrolyte, feeding from the annular electrolyte flow path of the first cell, into the cylindrical hollow electrolyte flow path of the second cell; and a second electrolyte flow channel diverting electrolyte, feeding from the outer major face of the outer electrode member of the first cell, into the annular electrolyte flow path of the second cell.

The invention is yet further directed to the method of electrolyzing an electrolyte with an electrolyzer having first and second cells, each cell having cylindrical and hollow inner and outer electrode members providing an electrolyte flow path through the hollow channel of the inner electrode member, each cell being positioned at least substantially coaxial to one another, but spaced apart from each other and having electrolyte flow between, as well as through, the cells, with the cylindrical electrode members of each cell having inner and outer major cylindrical faces as well as being concentric with one another thereby establishing an annular electrolyte flow path therebetween, which method comprises:

feeding electrolyte to the electrolyte flow path through the hollow channel of the inner electrode member of the first cell, as well as through the annular electrolyte flow path between the concentric electrode member of the first cell;

flowing electrolyte along the outer cylindrical face of the first cell;

channeling the electrolyte feeding from the annular flow path between the concentric electrode members of the first cell to the hollow channel of the inner electrode of the second cell; and channeling electrolyte flow from the outer cylindrical surface of the first cell to the annular flow path of the second cell.

DESCRIPTION OF THE PREFERRED EMBODIMENTS

The metals of the cylindrical anode will most always be valve metals, including titanium, tantalum, zirconium and niobium. Of particular interest for its ruggedness, corrosion resistance and availability is titanium. As well as the normally available elemental metals themselves, the suitable metals of the anode can include metal alloys and intermetallic mixtures. For example, titanium may be alloyed with nickel, cobalt, iron, manganese or copper. By use of elemental metals, it is most particularly meant the metals in their normally available condition, i.e., having minor amounts of impurities. Thus, for the metal of particular interest, i.e., titanium, various grades of the metal are available including those in which other constituents may be alloys. Preferably, for economy of manufacture and in use of the anode, the metal is either grade 1 or grade 2 titanium. Although it will be understood that for the anode the metal will virtually always be coated, which coatings will be more fully discussed hereinbelow, for convenience there may be used herein terms such as simply "the metal anode".

The cathode in the electrolytic cell may also be metallic and useful metals include nickel and steel, as well as valve metals such as titanium. Other metal cathodes can be in intermetallic mixture or alloy form, such as iron-nickel alloy, or alloys with cobalt, chromium or molybdenum, and include stainless steel and HASTELLOY (trademark) alloys such as HASTELLOY C nickel alloy. Also, the metal of the cathode may essentially comprise nickel, cobalt, molybdenum, vanadium or manganese. The active electrode surfaces of the cathode can be uncoated, e.g., a bare, smooth nickel metal cathode. Alternatively, the active surface for the cathode might be a layer of, for example, nickel, molybdenum, or an oxide thereof which might be present together with cadmium. Other metal-based cathode layers can be provided by alloys such as nickel-molybdenum-vanadium and nickel-molybdenum. Such activated cathodes are well known and fully described in the art.

Figure 1:
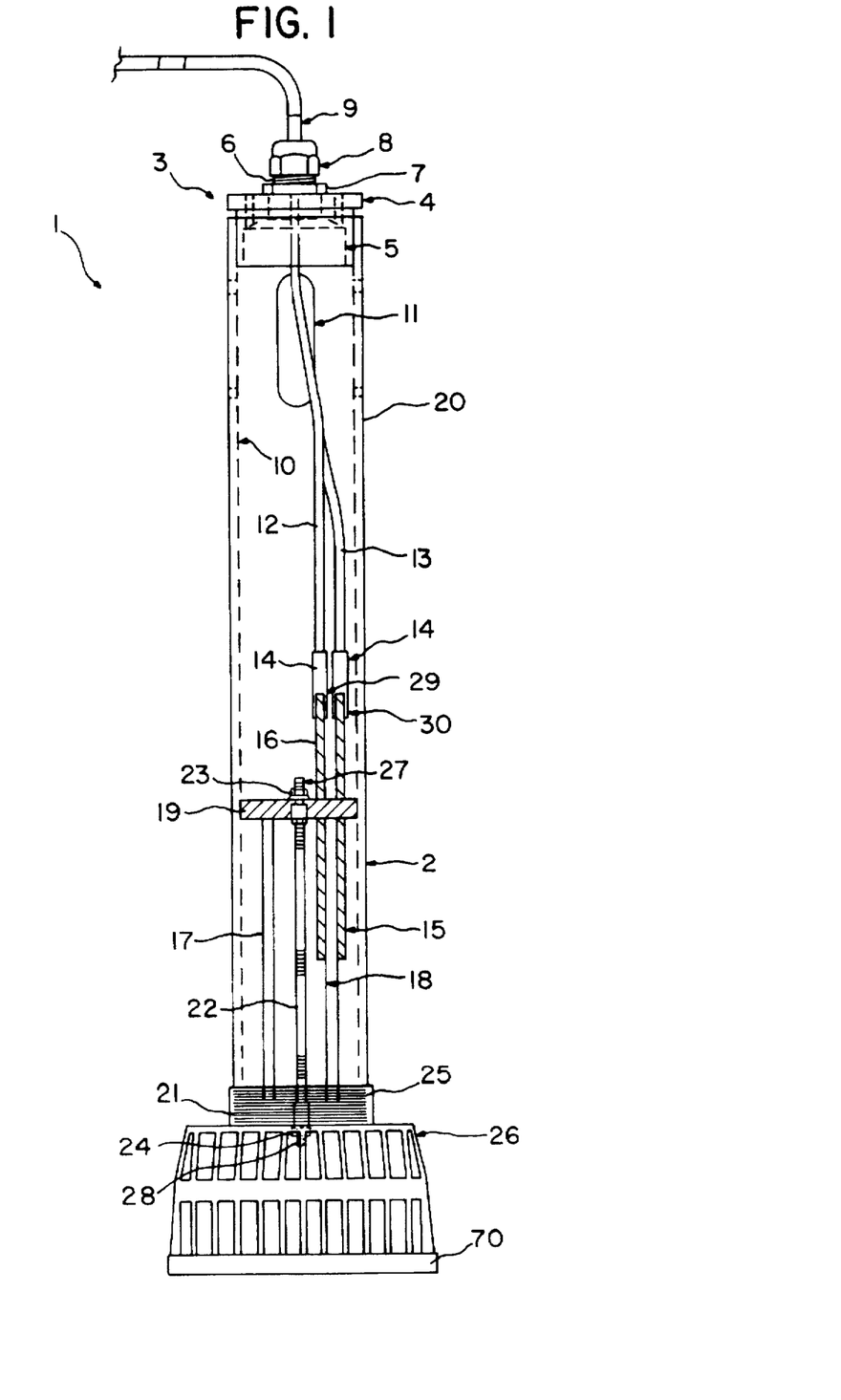
FIG. 1 is an elevation view, in section, of an electrolyzer assembly of the present invention having a cylindrical anode and cathode pair.

Referring then to FIG. 1, there is shown, as representative of the present invention, an electrolyzer assembly 1 having a cylindrical housing member 2. The housing member 2 has an outer major face 20 and an inner major face 10. The housing member 2 has a top that is sealed by closing means comprising a reducer bushing 3. This reducer bushing 3 has a lid 4 and a depending circumferential sealing member 5 that is wedged into, and provides a snug fit within, the housing member 2. As means for providing electrical connection through the top of the housing member 2, there is provided above the lid 4 a connector of a nut 6, a lid bolt 7 and a capping nut 8. Extending upwardly from the capping nut 8 is an electrical connector conduit 9. This conduit 9 can connect, for example, to a source of electrical power, not shown. The reducer bushing 3, including the lid 4 and sealing member 5, can typically be made of a polymeric material such as polyvinyl chloride or polyvinylidene fluoride, while the nuts 6, 8 and bolt 7 may also be of a polymeric material, e.g., a polyamide polymeric material such as nylon. The housing member 2, as well as the conduit 9, may be made from the same material, such as of polyvinyl chloride.

Below the cap 3, the housing member 2 is perforated around the member 2 with a series of elongate, oval shaped apertures 11. Emerging through the cap 3 and the connector nut 6 are a pair of first and second electrical cables 12, 13, sometimes referred to herein as flexible electrical current carrying means, but more usually, for convenience, simply as "cables" 12, 13. Each of the cables 12, 13 is connected through a coupling nut 14 to an elongate electrical connector element 15, 16, sometimes referred to herein as "rod elements" 15, 16 or just "rods" 15, 16. The first cable 12 connects to a rod element 16 at the element's upper threaded end 29 and the second cable 13 connects to a rod element 15 at the element's upper threaded end 30. One rod element 15, on its opposite end from its connection to a cable 13, is secured to a cylindrical anode 17. The other rod element 16 is similarly secured, but to a cylindrical cathode 18 which is positioned concentrically within the anode 17. As will be understood, the anode 17 and cathode 18 are "electrodes" and such word may be used generally herein, when convenient, to refer to either the anode 17 or cathode 18 or to both.

The anode 17 and cathode 18 are positioned within the housing member 2 between an upper support plate member 19 and lower support plate member 21, which may also be referred to herein as electrode holders 19, 21. Means for securing the anode 17 and cathode 18 to the holders 19, 21 includes a fastener rod 22. The rod 22 has a threaded upper end 27 that projects through the upper holder 19 and a threaded lower end 28 that projects through the lower holder 21. The upper threaded end is secured to the upper electrode holder 19 by an upper nut 23 and the lower threaded end is secured to the lower electrode holder 21 by a lower nut 24. At its lower end, the housing member 2 has an outside threaded section 25. To this threaded section 25 there is connected a strainer member 26. This strainer member 26 can have a flat bottom, e.g., as provided by a flat bottomed base plate 70, whereby said electrolyzer assembly 1 can be readily free-standing. The strainer member 26 is typically made from a non-conductive material, e.g., a polymeric substance such as polyvinyl chloride.

It is contemplated that the electrolyzer assembly 1, in one operating mode, can be virtually completely submersed in electrolyte, such as may be contained in a large tank (not shown). In this mode, the conduit 9, or this conduit 9 plus additional assembly above the apertures 11 can be above the electrolyte level in the tank. But the outer major face 20 of the housing member 2, such as below the apertures 11, may be in contact with the electrolyte. In this mode, electrolyte from the tank enters the assembly 1 through the strainer member 26 and passes up through the housing member 2. This electrolyte flow can be provided such as by a pump, not shown, e.g., pumping electrolyte into the strainer member 26. Electrolyte flow may also be provided, with or without pumping, by gas driven flow. Electrolyzed electrolyte then exits the housing member 2 through the housing apertures 11. In this mode, electrolyte in the tank can circulate continuously through the assembly 1, thus continuously enriching the electrolyte in the tank with electrolysis product during electrolyzer operation.

Figure 2:
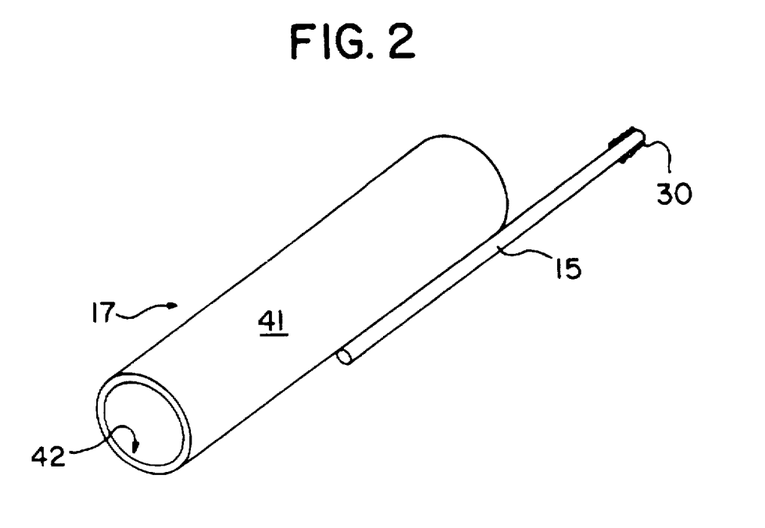
FIG. 2 is a perspective view of an electrode for the electrolyzer of FIG. 1, which electrode has a cylindrical body with an elongate electrical connector element secured thereto.

Referring then to FIG. 2, there is depicted a cylindrical electrode which, for purposes of this description and since the rod element 15 is depicted on the outer cylindrical face 41 of the electrode, will usually be referred to as anode 17. Since the anode 17 is the outer electrode of the anode and cathode pair 17, 18, it is preferred for best electrolyte circulation between the pair 17, 18 that the rod element 15 be affixed to the anode 17 on the anode outside face 41.

Similarly, the cathode rod element 16 is secured to the inner surface of the cathode 18. The rod element 15 for the anode 17 can be a metal member such as of the valve metals noted hereinbefore. Rod elements 15, 16 may be of the same metal as the electrode to which they are secured, e.g., the rod element 15 for the anode 17 will generally for economy be a valve metal element 15 and is preferably a titanium rod element 15. For the cathode 18, the rod element 16 may typically be of a metal such as steel or nickel or nickel alloy, e.g., HASTELLOY C (trademark), or a valve metal, usually titanium. The rod elements 15, 16 are typically solid, rigid metal rod elements 15, 16 that are circular in cross-section, although other cross-sections are contemplated, e.g., arch-shaped, at least in the portion secured to the anode 17. The diameter of the rod element 15 can be generally much smaller than the diameter of the electrode, e.g., about 15 percent to about 25 percent of the diameter of the cathode 18.

For either anode 17 or cathode 18, the rod elements 15, 16 can be secured to the electrode such as by brazing, soldering or conductively adhesively affixing the rod element 15 to the electrode. However, for purposes of efficiency and economy, the rod elements 15, 16 are welded to the electrode. This welding can be welding such as fusion welding, TIG welding or resistance welding. Usually, if the cylindrical anode 17 is electrocatalytically coated, it is coated only on its inner cylindrical surface 42, i.e., the surface facing the cathode 18, although coating of its outer cylindrical surface 41 is contemplated for electrolyzer performance maintenance. Conversely, if the cathode 18 is coated, it is usually coated on its outer cylindrical surface 41. Generally, for efficient assembly, the rod element 15 is secured to the anode 17 before applying electrocatalytic coating to the anode 17. The rod element 16 can be secured to the cathode 18 typically before or after cathode coating. The rod elements 15, 16 may be, but usually are not, coated.

The rod element 15 extends in an axial direction along at least a substantial length of the anode 17. Generally, for secure connection between the rod 15 and anode 17, this rod extends along about 30–70 percent of the length of the anode 17, and more typically along about 40–60 percent of such length. Then, generally, the rod extends beyond the anode 17 for a distance of less than 50 percent of its own length. For example, typically about 20–40 percent of the length of the rod 15 will extend beyond the anode 17. The rod 15 has a threaded end 30 at the end beyond the anode 17 for connecting to a cable 13 (FIG. 1), at a coupling nut 14. As will be seen in FIG. 1, for this representative arrangement of the present invention, even with the extended rod element 15, the cable 13 will nevertheless extend for a substantial amount of the total length of the housing member 2. Thus, typically such cable 13 in the FIG. 1 assembly can be expected to extend from about 40 to about 60 percent of the length of the housing member 2. Conversely, the cell that is comprised of the anode 17 and cathode 18 pair extends less than 50 percent of the length of the housing member 2. However, it will be understood that the length in the housing member 2 of an anode 17 and cathode 18 pair for the electrolyzer of FIG. 1 can be varied in accordance with the specific requirements of a particular design. Thus, this pair might extend a much greater distance, e.g., 70 to 80 percent or more of the distance of the housing member 2 from the strainer member 26 up to the apertures 11.

Figure 3:
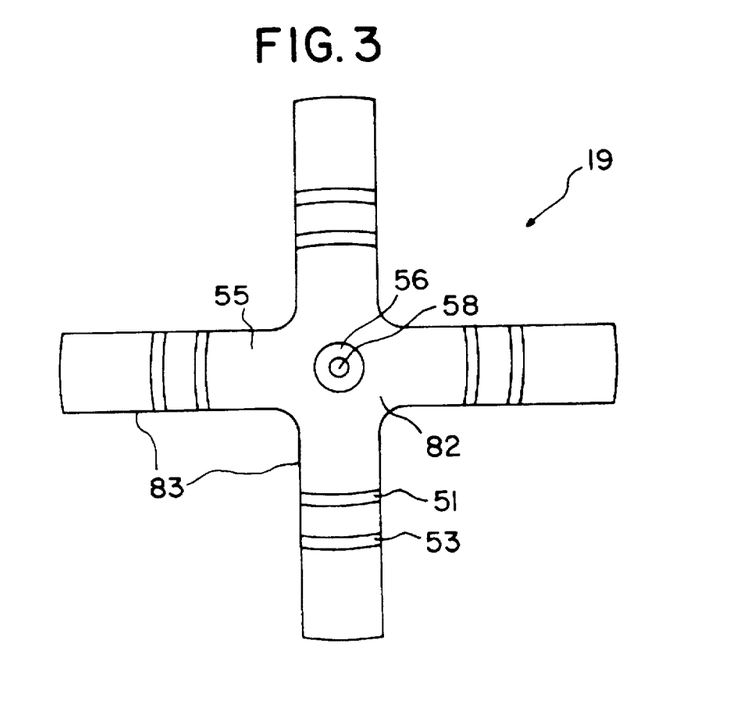
FIG. 3 is a top plan view of an electrode holder utilized in the electrolyzer of the assembly of FIG. 1 for securing the cylindrical anode and cathode pair within the electrolyzer.

Referring then to FIG. 3, there is disclosed an electrode holder 19. This holder 19 has a central section 82 from which protrude arms 83. The arms 83, being four in number and projecting outwardly from the central section 82 opposite one another, form a figure in the general shape of a Greek cross. Each arm 83 has a wide, flat inner surface 55. In each arm 83 on its inner surface 55 there is an inner slot 51 and outer slot 53. The central section 82 has an enlarged central aperture 56 that necks down into a smaller aperture 58. This electrode holder 19 may also be referred to herein for convenience as a "plate member" and, owing to the apertures 56, 58, as well as the large open areas between the arms 83, may sometimes be referred to as a "perforate plate member".

Figure 4:
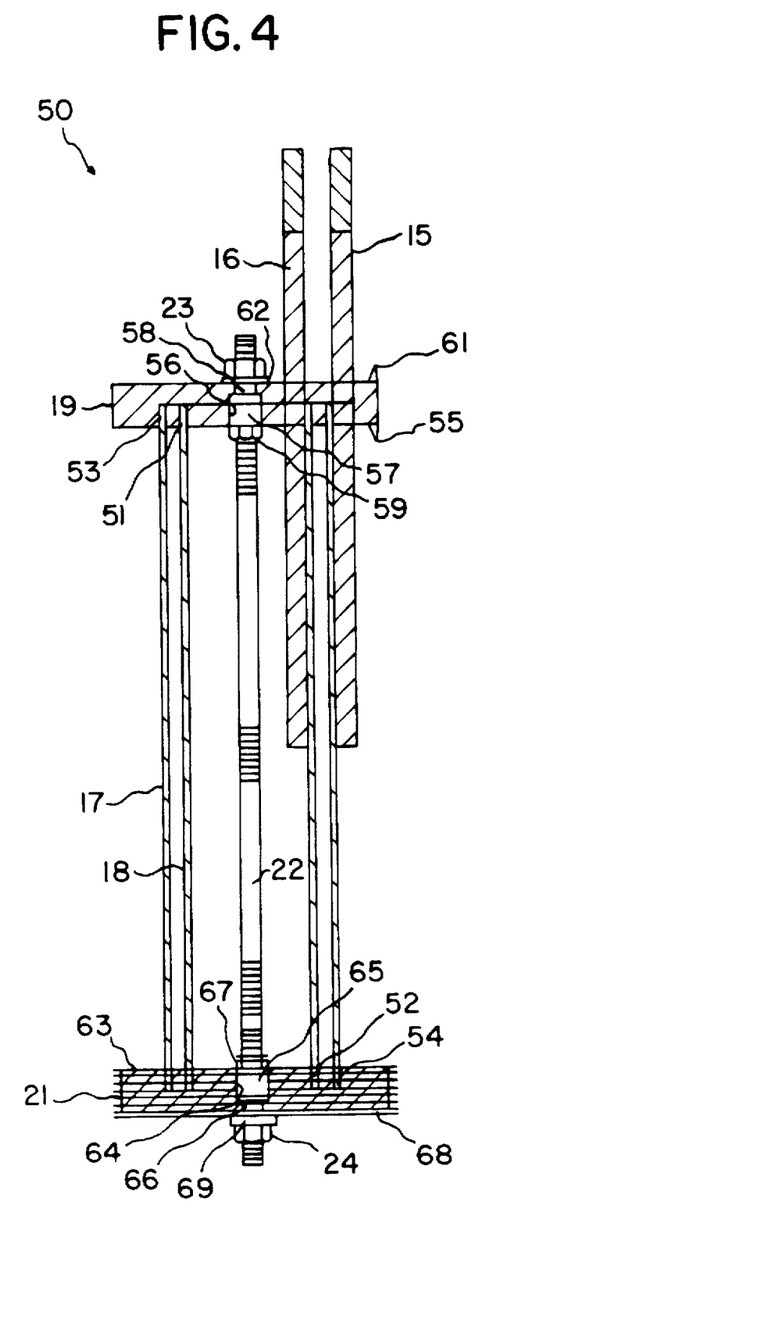
FIG. 4 is an elevation view, in section, of a cylindrical anode and cathode pair unit as utilized in the assembly of FIG. 1.
Figure 5:
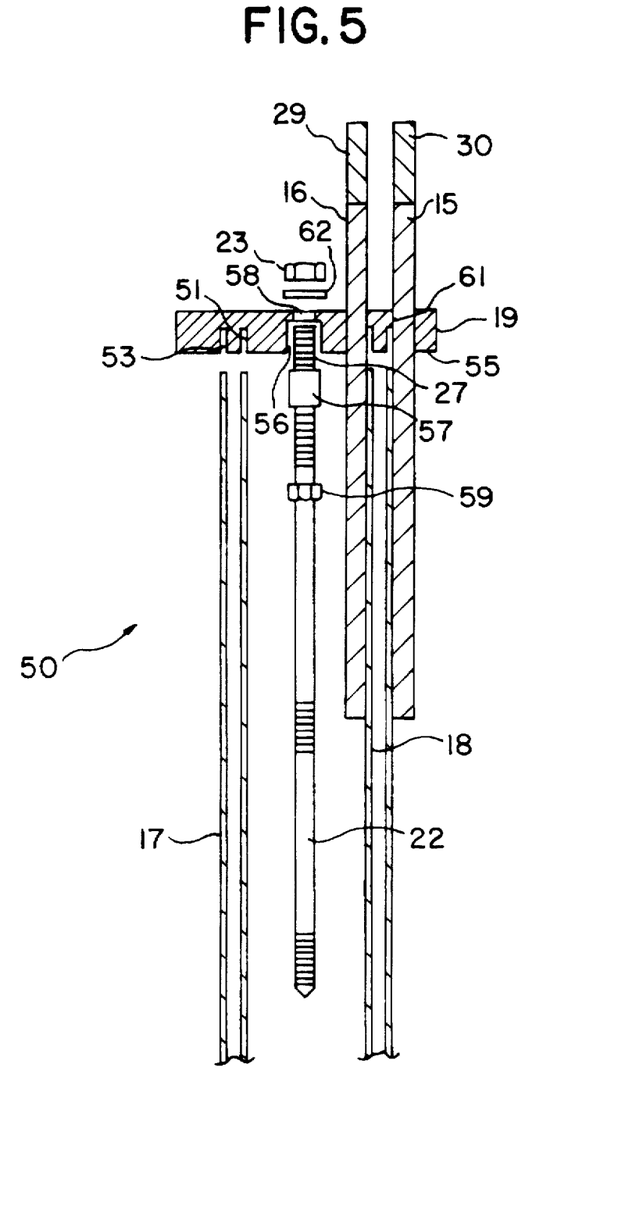
FIG. 5 is a partial, exploded, elevation view in section of the anode and cathode pair unit of FIG. 4.

Referring then to FIG. 4, there is depicted a preassembled anode 17 and cathode 18 pair assembly 50. Both the anode 17 and cathode 18 have rod elements 15, 16. This electrode assembly 50 has the cathode 18 inserted in an inner slot 51 of the upper electrode holder 19 (FIG. 5). The lower end of the cathode 18 is similarly positioned in an inner slot 52 in the lower electrode holder 21. The cathode is thus held in position in these slots 51, 52. In a similar manner, the anode 17 is inserted into an outer circular slot 53 in the upper electrode holder 19 (FIG. 5) as well as in an outer circular slot 54 of the lower electrode holder 21. The anode 17 is thus also positioned by insertion into these slots 53, 54. These electrode holders 19, 21 are nonconductive and are typically made of a dielectric material such as polyvinyl chloride or other non-conductive, usually polymeric material such as polyvinylidene fluoride.

Inserted through the center of the electrode assembly 50 is the fastener rod 22. In the upper electrode holder 19 there is, in the bottom surface 55 of such holder 19, an enlarged aperture 56. This enlarged aperture 56 proceeds a substantial distance into the upper holder 19, e.g., a major distance of greater than 50 percent of the thickness of the upper holder 19. This enlarged aperture 56 accommodates an enlarged alignment insert 57 that is secured onto the fastener rod 22. Above the enlarged aperture 56 in the upper holder 19 is a smaller aperture 58 through the balance of the thickness of the upper holder 19. This smaller aperture 58 accommodates the fastener rod 22. As depicted in the figure, it is preferable that the alignment insert 57 fit completely within the enlarged aperture 56 of the upper electrode holder 19. However, other configurations, such as an insert 57 which protrudes below the bottom surface 55 of the upper electrode holder 19, is contemplated. Below the insert 57 a retaining nut 59 is securely threaded against the insert 57 for firmly embedding the insert 57 into the aperture 56.

On the upper surface 61 of the upper electrode holder 19, there is initially provided around the fastener rod 22 a thin washer 62. This washer 62 seats against the upper surface 61 of the holder 19. Above the washer 62, also around the fastener rod 22, is the upper nut 23. This upper nut 23 is securely threaded against the washer 62. As will be understood, this same assembly for the upper electrode holder 19 is duplicated in mirror image for the lower electrode holder 21. Thus, the lower electrode holder 21 arrangement has an inner surface 63, enlarged aperture 64, alignment insert 65, smaller aperture 66, retaining nut 67, outer surface 68, thin washer 69, and lower nut 24. In this electrode assembly 50, both the upper and lower nuts 23, 24 and both alignment inserts 57, 65 as well as retaining nuts 59, 67 and thin washers 62, 69, and further including the fastener rod 22, are made of dielectric material. Such dielectric material can include polyvinyl chloride as well as other non-conductive polymeric materials including polyolefins and polyvinylidene fluoride. Preferably, for ease of assembly as well as economy, the material of these members is polyvinyl chloride.

The anode 17 and cathode 18 pair may be preassembled into the anode and cathode pair assembly 50. For this, and referring first to FIG. 4, initially, the retaining nut 67 is threaded onto the fastener rod 22 and the alignment insert 65 placed thereon, then the rod 22 is inserted in the apertures 64, 66 in the lower electrode holder 21. This insertion is done in a manner inserting the alignment insert 65 into the enlarged holder aperture 64 as well as in a manner providing a projecting threaded end 28 of the rod 22 projecting beyond the outer surface 68 of the plate 21. The thin washer 69 and lower nut 24 can then be secured onto this threaded end 28 of the rod 22. Next, the inner cylindrical cathode 18 can be inserted in the inner slot 52 and the anode can be inserted into the outer circular slot 54 of the lower electrode holder 21.

Then referring to FIG. 5, the retaining nut 59 with the alignment insert 57 on top, is placed on the fastener rod 22. Next, the upper electrode holder 19 can be slid down over the electrical connector rods 15, 16 from their threaded ends 29, 30. As the upper holder 19 approaches the electrodes, it can be first slid over the fastener rod 22 by inserting alignment insert 57 into the enlarged aperture 56 and projecting the fastener rod 22 through the smaller aperture 58 so as to project the threaded upper end 27 of the fastener rod 22 beyond the outer surface 61 of the upper electrode holder 19. Then by means of sliding the upper holder 19 over the fastener rod 22, the cathode 18 is inserted into the inner slot 51, and the anode 17 into the outer slot 53 of the upper holder 19. The retaining nut 59 can be tightened to secure the alignment insert 57 into the enlarged aperture 56 of the holder 19. While this is proceeding, the thin washer 62 and upper nut 23 can be placed on the threaded upper end 27 of the fastener rod. The tightening of this upper nut 23 completes the assembly of this anode and cathode pair assembly 50.

Figure 6:
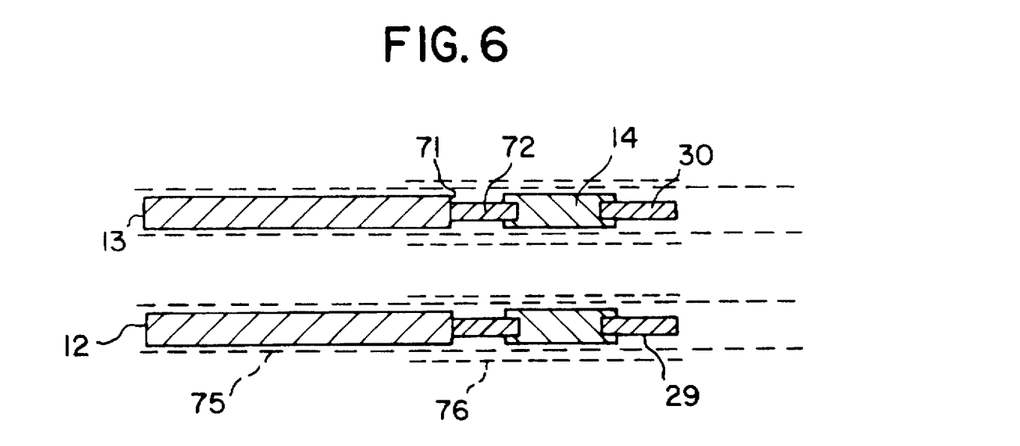
FIG. 6 is a perspective view, in partial section, of an electrical connection means for the electrolyzer assembly of the present invention.
Figure 6A:
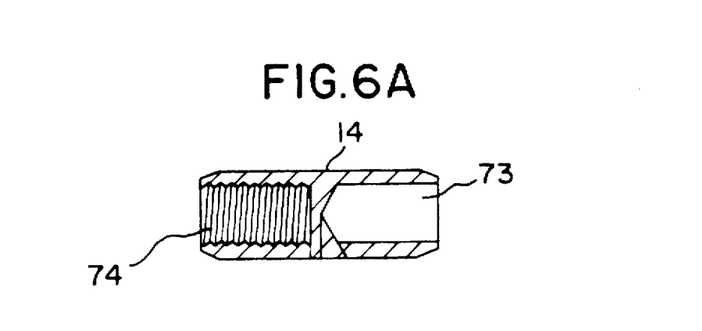
FIG. 6A is a sectional view of a coupling member used in the connection means of FIG. 6.

Referring then most particularly to FIGS. 6 and 6A, first and second electrical cables 12, 13 extending in a housing member 2 (FIG. 1) have the outer insulating sheath removed from a short end of the cables 12, 13 to expose a short length of wire 72. The wire 72 can be a multi-stranded wire 72, such as of copper, that may be coated, e.g., tin plated. This exposed wire 72 has been inserted into a recess 73 (FIG. 6A) located at one end of a coupling nut 14. On the opposite end of the coupling nut 14, the threaded ends 29, 30 of rods 15, 16 extending from an anode 17 and a cathode 18 (FIG. 1) are inserted into a threaded recess 74 (FIG. 6A) of the coupling nut 14. In securing the cables 12, 13 to the coupling nut 14, the nut 14 can be swaged (crimped) onto the inserted wire 72. However, other means may be employed, e.g., a soldered connection or a brazed connection. Generally, the coupling nut 14 will be made from an electrically conductive metal such as copper.

Enveloping the cables 12, 13, the exposed wire 72, the coupling nuts 14 and rods 15, 16, is an inner sleeve 75. Such a sleeve 75 can be of a material resistant to the typically brine and hypochlorite environment of the electrolyte. Suitable materials for the sleeve 75 include polyvinyl chloride and heat shrink materials, including polyolefin materials such as polyethylene, and polypropylene, which may be used with adhesive. Preferably, for best protection of the underlying elements, the inner sleeve 75 is a heat shrink sleeve 75. Additionally, it is advantageous for enhanced element protection, to provide an outer sleeve 76 over that portion of the connection elements extending from the end of the cables 12, 13 near the exposed wires 72 past the coupling nuts 14 and over the ends of the connector rods 15, 16. Similar considerations for this outer sleeve 76 apply as for the inner sleeve 75, i.e., it should be of material resistant to the environment and is preferably a heat shrink sleeve 76, such that materials including polyethylene can be used for this sleeve 76.

In assembling the electrolyzer assembly 1, a reducer bushing 3 can have cables 12, 13 extended therethrough. Then, an electrode assembly 50 (FIG. 4), preassembled as described hereinbefore with reference to FIG. 5, can be connected (FIG. 6) to the cables 12, 13 extending through the reducer bushing 3. Next, the electrode assembly 50 can be positioned and secured within the housing member 2. Securing of the electrode assembly 50 within the housing member 2 is preferably a mechanical securing, to provide for ease of disassembly. For example, a lock ring such as of polyvinyl chloride can be inserted ahead of the upper electrode holder 19. Also, a lock ring can be squeezed in and inserted in the housing member 2 below the lower electrode holder 21. Thereafter, where a strainer member 26 will be utilized, it can be screwed onto the threaded bottom portion of the housing member 2.

Figure 7:
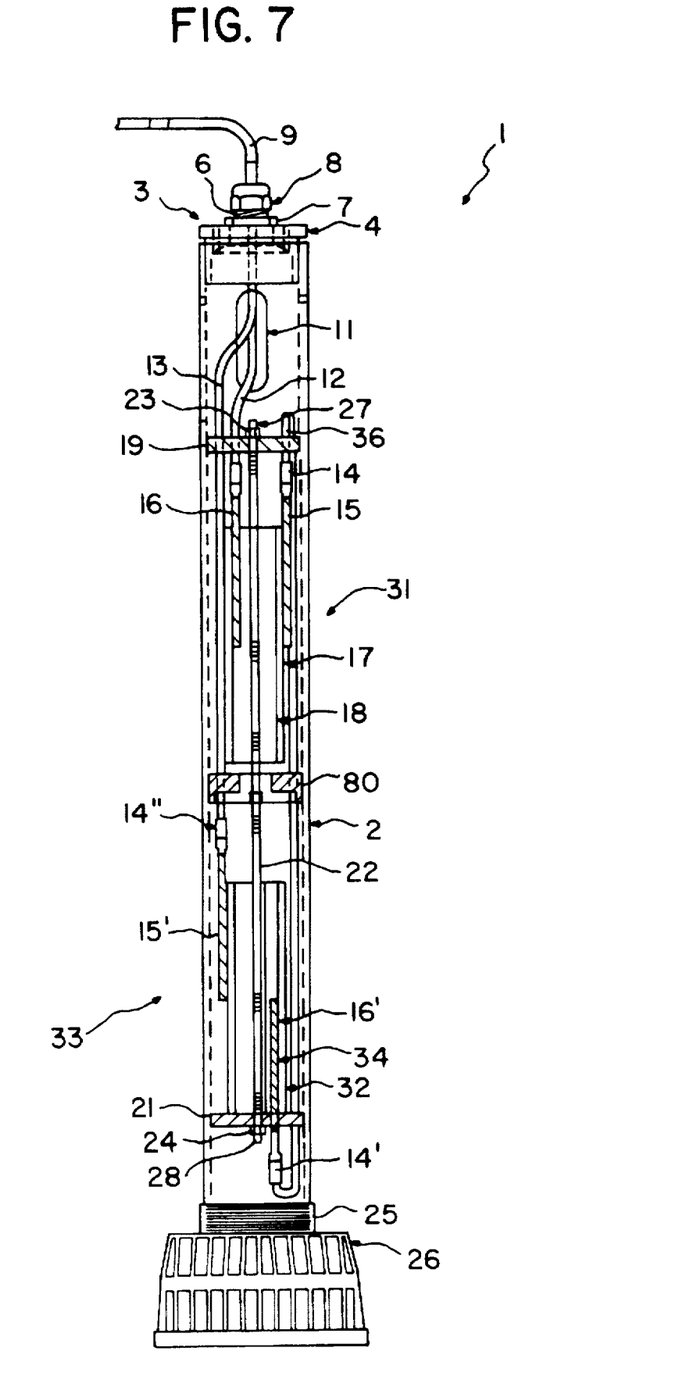
FIG. 7 is an elevation view, in section, of an electrolyzer assembly representative of the present invention, having a first cylindrical anode and cathode pair positioned about midway within the assembly, as well as a second cylindrical anode and cathode pair positioned in the assembly below the first anode and cathode pair.

As depicted in FIG. 7, an electrolyzer assembly 1 has a housing member 2, and reducer bushing 3 including a lid 4. Also, the electrolyzer assembly 1 has a connector nut 6, lid bolt 7 and capping nut 8, as well as upwardly extending electrical connector conduit 9 as in FIG. 1. Moreover, below the reducer bushing 3 are apertures 11 in the housing member 3. Likewise, the electrolyzer assembly 1 of FIG. 7 has inner cables 12, 13. As in FIG. 1, cable 12 connects with a rod 16 that is secured to a cylindrical cathode 18. However, in FIG. 7, cylindrical cathode 18 is part of a first, or upper, electrode pair 31. This upper electrode pair 31 has an outer anode 17 that is secured through a rod 15 and coupling nut 14 to a cable 36 that extends through an upper electrode holder 19. However, in the embodiment in FIG. 7, this cable 36 does not connect with the inner cable 13.

Rather, the cable 36 extends to a first coupling nut 14', connected to a rod 16' that is secured to a cathode 34 of a lower electrode pair 33. Then, the inner cable 13 coming through the reducer bushing 3 extends past the upper electrode pair 31 and connects through a second coupling nut 14" to a rod 15' which connects to the anode 32 of the lower electrode pair 33. These upper and lower electrode pairs 31, 33 are depicted in FIG. 7 in an exploded view, i.e., apart from one another. As finally assembled, the upper electrode pair 31 is positioned against the upper electrode holder 19. Then, the lower electrode pair 33 is situated on the lower electrode holder 21. Moreover, the electrode pair 31, 33, as assembled, come together against an anode/cathode holder 80, which can be made of the same material as for the other electrode holders 19, 21. This anode/cathode holder 80 is usually a variation of the other electrode holders 19, 21, but the term "electrode holder" may be used herein to refer generally to all of these holders 19, 21, and 80. The electrode holders 19, 21 are secured against their respective electrodes, and the electrode pairs 31, 33 are brought toward each other and against the anode/cathode holder 80, by a fastening rod 22 having an upper threaded section 27 to which an upper nut 23 is attached, as well as a lower threaded section 28 to which a lower nut 24 is secured. At the lower end of the housing member 2 is a threaded section 25 to which a strainer member 26 is attached.

Figure 8:
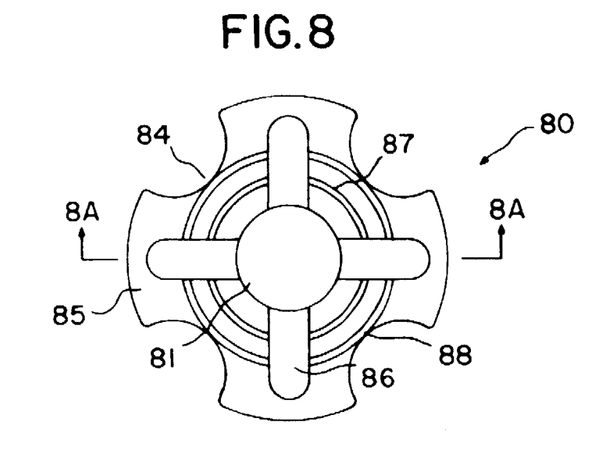
FIG. 8 is a bottom plan view of an electrode holder utilized between the first and second cylindrical anode and cathode pairs of FIG. 7.

As shown in FIG. 8, the bottom of the anode/cathode holder 80 has a central aperture 81 extending through the holder 80. At the periphery of the holder 80 there are scallop-shaped, through-slots 84 that also extend through the entire thickness of the holder 80. For the particular holder 80 shown in FIG. 8, there are four of these slots 84 symmetrically positioned around the edge of the holder 80. Between each slot 84, and also being four in number, are holder sections 85. As seen in the figure, the face of each holder section 85 has, to a partial depth within the section 85, a bottom flow channel 86. Each bottom flow channel 86 extends from near the outer periphery of the holder 80 into the central aperture 81 of the holder and connects to this central aperture 81. Additionally, there are present in the bottom face of the holder 80 an inner electrode receiving slot 87, for receiving the top edge of the cathode 34 of the lower electrode pair 33 (FIG. 7) and an outer electrode receiving slot 88, for receiving the top edge of the anode 32 of the lower electrode pair 33. These electrode receiving slots 87, 88 extend only slightly into the thickness of the holder 80.

Figure 8A:
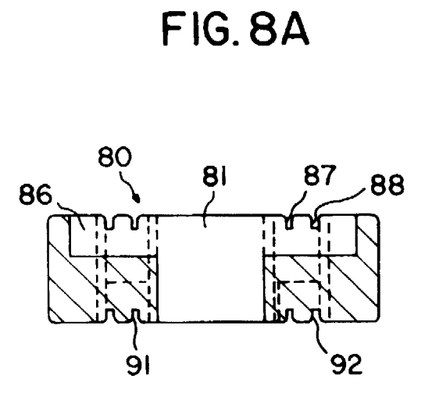
FIG. 8A is a sectional view of the electrode holder of FIG. 8 taken along the plane 8A—8A.

In FIG. 8A, taken along the plane 8A—8A of FIG. 8, it is seen that the central aperture 81 of the holder 80 extends through the entire thickness of the holder 80. Additionally, the bottom flow channels 86 are present to only a partial depth of the total thickness of the holder 80. At even a lesser depth into the thickness of the holder 80 are the inner and outer electrode receiving slots 87, 88. At the same lesser depth, but on the opposite, or top, surface of the holder 80, are inner and outer electrode receiving slots 91, 92 which receive the bottom edges of the cathode 18 and anode 17 of the upper electrode pair 31 (FIG. 7).

Figure 9:
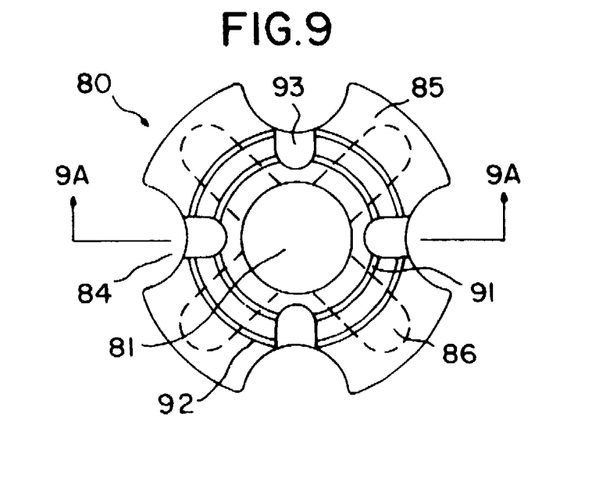
FIG. 9 is a top plan view of the electrode holder of FIG. 8.

Then referring to FIG. 9, the anode holder 80 is shown from the top, but rotated 45° from the plan view of FIG. 8. The holder 80 has the central aperture 81, four scallop-shaped through-slots 84, four holder sections 85, and inner and outer electrode slots 91, 92. There are additionally shown, in dashed line, the positioning of the four bottom flow channels 86 (FIG. 8). Inwardly from each scallop-shaped through-slot 84, and having a depth only part way into the thickness of the holder 80, is a top flow channel 93. Each top flow channel 93 extends from a scallop-shaped through-slot 84 past the inner and outer electrode receiving slots 91, 92 but stops short of extending into the central aperture 81.

Figure 9A:
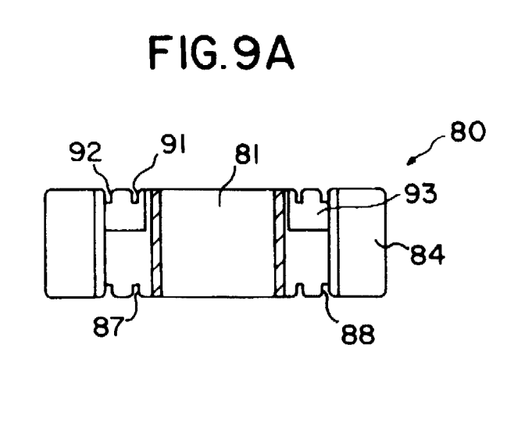
FIG. 9A is a sectional view of the electrode holder of FIG. 9 taken along the plane 9A—9A.

As seen in FIG. 9A, taken along the plane 9A—9A of FIG. 9, the central aperture 81 and the peripheral through-slots 84 extend through the holder 80. Extending part way into the holder 80, and connecting to the through-slots 84, are the top flow channels 93. These top flow channels 93 extend inwardly from the through-slots 84 and past the inner and outer electrode receiving slots 91, 92. At the bottom side of the holder 80 are the inner and outer electrode receiving slots 87, 88 for the lower electrode pair 33 (FIG. 7).

In assembling, the electrolyzer assembly 1 of FIG. 7, the general procedure as discussed hereinabove with respect to the assembly 1 of FIG. 1 can be followed. Thus, for example, cables 12, 13 can be extended through a reducer bushing 3. Also, the electrode pairs 31, 33 can be preassembled between electrode holders 19, 21 and with the anode/cathode holder 80 therebetween in the same general manner as for the preassembly of the electrode assembly 50. After the electrode pair assembly is secured in the housing member 2, a strainer member 26 can be added, where desired.

In operation of the electrolyzer assembly 1 of FIG. 7 to produce hypochlorite, such as from brine containing sodium chloride, the brine electrolyte enters the assembly 1 at the bottom through the strainer 26 and proceeds upwardly in the assembly 1. In the lower electrode pair 33 gaseous hydrogen forms on the outer face of the cathode 34 and evolves upwardly in that portion of the electrolyte flowing within the annular space between the cathode 34 and the anode 32. This provides a hydrogen gas evolution upward pumping effect on the electrolyte. This upward pumping effect as the gas proceeds upwardly in the annular space can assist or maintain upward circulation of electrolyte through the lower electrode pair 33. When this gas-containing portion of the electrolyte that is flowing within the electrode annular space reaches the anode/cathode holder 80, this electrolyte is directed by the bottom flow channels 86 into the central aperture 81 of the holder 80. In the central aperture 81, the gas-containing electrolyte joins electrolyte flowing up through the hollow center of the cathode 34. In turn, this aperture 81 channels this combined flow of electrolyte upwardly into the hollow center of the cathode 18 of the upper electrode pair 31. Thus, this gas-containing electrolyte from the lower electrode pair 33 proceeds upwardly within the cathode 18 of the upper electrode pair 31.

Simultaneously, electrolyte flowing upwardly by the lower electrode pair 33, but along the anode outside surface 41 (FIG. 2), passes into the peripheral through-slots 84 of the electrode holder 80. A portion of this hydrogen-gas-free electrolyte is then directed by the top flow channels 93 of the electrolyte holder 80 into the annular space between the anode 17 and cathode 18 of the upper electrode pair 31. Thus, electrolyte flowing into the annular space of the upper electrode pair 31 is gas-free. Fresh hydrogen gas is then evolved in the electrolysis of this entering, gas-free electrolyte in this annular space of the upper electrode pair 31. This provides a gas evolution pumping action to the electrolyte flowing upwardly in the upper electrode pair 31. Also, by not including any of the "old" hydrogen gas in this upper electrode pair annulus, which gas was generated in the lower electrode pair 33, the electrolysis in the upper electrode pair 31 is carried out without interference from the old hydrogen.

Referring again to FIGS. 1 and 4, it is preferred in making the electrode assembly 50 that the alignment inserts 57, 65 and the retaining nuts 59, 67 be eliminated. Thus, for this preferred embodiment, the electrode holders 19, 21 have central apertures therethrough of constant diameter. With regard to these electrode holders 19, 21, they can be a variety of shapes other than the shape shown in FIG. 3. For example, they may take the shape of a perforated disc. Moreover, in any shape, even the shape of FIG. 3, the holder 19, 21 may be perforated. Other shapes contemplated for these holders 19, 21 include shapes wherein the arms 83 are a multitude of thin spokes extending outwardly from the central section 82 of the holders 19, 21. The elongate electrical connector elements, or rods 15, 16 of the electrodes, may also be varied in shape. For example, they could approach fork, or spoon, shape, having a handle portion extending away from the electrode and a bowl, or tines, portion which could be secured to the surface of the electrode. For example, a bowl portion could be shaped to fit flush with the anode outer surface 41 of the anode 17 of FIG. 2.

Furthermore, the geometries of the electrodes can be varied. For example, as discussed hereinabove, the electrode pair could have a different geometry of length, extending much more greatly along the total length of the housing member 2, for the electrolyzer of FIG. 1. Then, in the electrolyzer of FIG. 7, the electrode pairs 31, 33 may be pairs of differing length one from the other. Usually, where more than one electrode pair is utilized in an assembly 1, the assembly will contain two electrode pairs, with it being understood, however, that the presence of more than two such pairs is contemplated. Also, the outer anode 17 in FIG. 1 could have a larger diameter extending the anode more closely to the inner major face 10 of the housing member 2. Similarly, the diameter of the inner cathode 18 of the electrode assembly could be extended in diameter to maintain the annular relationship between the electrodes as shown in FIG. 1. Moreover, according to the specific requirements of the particular electrolyzer assembly 1, the annular electrode spacing, e.g., between anode 17 and cathode 18 may be varied. Hence, the electrodes may be spaced further apart, to create a larger annular space than as depicted in the figures. Also, the electrode for economy can have proportionally thin walls. Thus, a representative electrode that is eight inches in length and one and one-half inches outside diameter, can have an about 0.05 inch wall thickness. For such an electrode, a representative connector rod can be about 0.3 inch in diameter and five and one-half inches in length with one and one-half inches of such length extending beyond the electrode.

Furthermore, it is contemplated that the inner cathode could itself be a solid member, i.e. a solid rod. Where more than one electrode pair is used in an assembly 1, the foregoing considerations of larger diameter electrodes, variation in inter-electrode spacing and solid rod cathode can be themselves varied between the pairs. However, in an assembly such as in FIG. 7, if a solid rod cathode is used in one electrode pair, it is preferred that such electrode be used in the lower electrode pair 31 in an electrolysis evolving gas at the cathode. This will permit the channeling of electrolyte flow between electrode pairs that has been discussed hereinabove with reference to FIG. 7.

However, preferably for economy as well as efficiency of construction, the electrodes all will have uniform geometry in length and diameter. This will permit, with housing members 2 of the same length, the ready construction of a FIG. 1 or FIG. 7 assembly, with the electrode assemblies 50 being interchangeable. It is also preferred for parts interchangeability and electrolyzer assembly, that the electrodes be in the form as shown, i.e., circular in cross section. However, the electrodes need not always be explicitly in such form and other, generally similar forms, such as oval in cross section, are contemplated for use. Thus, as used herein, the word "cylindrical" is meant to include not only forms which are circular in cross section, but also such other generally similar forms, e.g., oval in cross section. Although the electrodes and electrode pairs have been shown in the figures to be aligned in a coaxial manner, as well as coaxial with the housing member 2, it is contemplated that such need not always be the case. Thus, an upper electrode pair 31 might be positioned where it is not completely coaxial with a lower electrode pair 33, or the lower electrode pair 33 might be shifted so as not to be coaxial with the housing member 2, as to accommodate spacing of a rod 15' within the housing member 2. Where electrode pairs are shifted away from coaxial alignment, they will nevertheless preferably be only slightly shifted, e.g., be at least substantially coaxial, particularly where an anode/cathode holder 80 is employed in the electrolysis and the electrolyte forms a gas at the cathode.

As mentioned hereinbefore, the electrolyzer assembly 1 can operate in a submersed mode, i.e., where the assembly 1 is submersed in electrolyte. In this mode, because of the portability of the assembly 1, it might be placed in a container such as a tank or a bucket of electrolyte and can be placed upright with the strainer member 26 placed at the bottom of the container. In this position, the assembly 1 is free-standing. However, it is contemplated that the assembly could also be placed in the container such as a bucket and leaned against the side of the bucket. Thus, the assembly need not always be placed in a completely upright condition for operation. Some tipping of the assembly 1 away from the vertical can be tolerated. Thus, by use herein of the word "upright" it is meant that the assembly 1 may be tipped from the vertical but is nevertheless in an at least substantially standing position as opposed to horizontal positioning. Also, the assembly 1 need not be placed in a container, but could be situated where electrolyte is fed, as by a conduit, e.g., an electrolyte feed conduit, to the base of the assembly 1 to enter the housing member 2. Then, electrolyte containing resulting electrolysis product could be conveyed away from the housing apertures 1, as by a product removal conduit, and away from the assembly 1. Thus, the assembly 1 can function in a batch mode, e.g., when placed in a container such as a tank, or in continuous mode.

As shown in FIG. 7 one rod 16' of the lower electrode pair 33 projects upwardly into the cathode 34 and one rod 15' projects downwardly into the anode 32. It is preferred that both rods 15', 16' project upwardly from below the electrode pair 33 in the manner as depicted in the figure for the rod 16'. For the assemblies of FIGS. 1 and 7, the electrode assemblies will be typically in monopolar arrangement. Hence, the specific arrangement shown in FIG. 7 for the electrode pairs is monopolar in series. However, bipolar arrangements are contemplated. For example, the coatings on electrodes can be adjusted, as by coating only half a length of an electrode in an electrode pair in providing a bipolar electrode arrangement for such pair.

As representative of the electrochemically active coatings for the anode that may be applied to the metal substrate are those provided from platinum or other platinum group metals or they can be represented by active oxide coatings such as platinum group metal oxides, magnetite, ferrite, cobalt spinel or mixed metal oxide coatings. Such coatings have typically been developed for use as anode coatings in the industrial electrochemical industry. They may be water based or solvent based, e.g., using alcohol solvent. Suitable coatings of this type have been generally described in one or more of the U.S. Pat. Nos. 3,265,526, 3,632,498, 3,711,385 and 4,528,084. The mixed metal oxide coatings can often include at least one oxide of a valve metal with an oxide of a platinum group metal including platinum, palladium, rhodium, iridium and ruthenium or mixtures of themselves and with other metals. Further coatings include tin oxide, manganese dioxide, lead dioxide, cobalt oxide, ferric oxide, platinate coatings such as $M_xPT_3O_4$ where M is an alkali metal and x is typically targeted at approximately 0.5, nickel-nickel oxide and nickel plus lanthanide oxides.

The assembly 1 can be useful for the electrolysis of a dissolved species contained in a bath, such as in electrolyzers employed to produce hypochlorite from sodium or potassium brines, and also employed for reduction of organics and similar oxidation-reduction electrolysis.

We claim:

1. A portable and upright, cylindrical electrolyzer assembly having at least one unseparated cell with electrodes provided by one cylindrical anode and cathode pair, said assembly comprising:

an elongate, upright, cylindrical and hollow dielectric electrolyzer housing member having a top, a bottom, and a cylindrical side-wall member having inner and outer major cylindrical faces, said side wall member adapted to contain electrolyte within said housing member;

means for providing electrical connection within said housing member through said top;

means for admitting electrolyte to said housing member through said bottom;

an upright, cylindrical and hollow metal anode member having a non-perforate side-wall, said anode member being positioned concentrically inside said dielectric housing member and spaced apart therefrom, said anode member providing said anode of said anode and cathode pair, as well as providing with said housing side-wall member an annular electrolyte flow path outside said anode member side-wall and inside said housing member inner major face;

an upright and cylindrical metal cathode member having a non-perforate side-wall, which cathode member is the cathode of said anode and cathode pair and which cathode member is situated concentrically within said anode member and spaced apart therefrom, thereby providing an annular electrolyte flow path between said anode and cathode pair; and elongate electrical connector elements positioned axially within said housing member and extending from said top to said anode member and cathode member; wherein electrical current enters said housing member through said top and is conveyed through said electrical connector elements to said anode and cathode pair, and electrolyte enters said assembly at said bottom and flows upwardly through the annular flow path between said anode and cathode pair, as well as upwardly through the annular flow path outside said anode member and inside said housing member inner major face.

2. The assembly of claim 1 wherein said housing member has a sealed top, an open bottom, and apertures through the side wall member near the sealed top serving as electrolyte outlet means, with said side wall member being non-perforate below said apertures for confining said electrolyte below said apertures.

3. The assembly of claim 2 wherein means for providing electrical connection within said housing member extends through said sealed top.

4. The assembly of claim 1 wherein said means for admitting electrolyte includes a bottom strainer element, and the resulting assembly with said strainer element is free-standing.

5. The assembly of claim 1 wherein each of said anode and cathode members has an elongate and upright electrically conductive rigid rod element secured to a cylindrical face thereof, which rod element extends in an axial direction along at least a substantial length of each such electrode, as well as projects axially beyond each such electrode.

6. The assembly of claim 5 wherein said rod element for said anode member is secured to an outer cylindrical face thereof, said rod element for said cathode member is secured to an inner cylindrical face thereof, and each rod element extends in an upright direction along about 30 to about 70 percent of the length of said electrode members.

7. The assembly of claim 5 wherein said rod element extends beyond said electrode for a distance of from about 20 to about 40 percent for the length of said rod element and said rod element, at its end beyond said electrode, engages a coupling member.

8. The assembly of claim 7 wherein said rod element, said coupling member, and flexible electrical current conveying means depending from said sealed top, together comprise said elongate electrical connector elements.

9. The assembly of claim 8 wherein said flexible electrical current conveying means depends downwardly at least 50 percent of the length of said upright and elongate housing member.

10. The assembly of claim 5 wherein said rod element is a metal element of one or more of nickel, steel or a valve metal of tantalum, zirconium, niobium or titanium, as well as their alloys and intermetallic mixtures, including stainless steel.

11. The assembly of claim 1 wherein said dielectric housing member is a member of polyvinyl chloride, polyvinylidene fluoride, or polyolefin.

12. The assembly of claim 1 wherein said electrolyzer has one cell and said cell is situated at the bottom portion of said housing member and extends upwardly less than about 50 percent of the length of said upright and elongate housing member.

13. The assembly of claim 1 wherein said anode member is a rigid metal anode and the metal of said member is a valve metal of one or more of titanium, tantalum, zirconium, niobium, their alloys and intermetallic mixtures.

14. The assembly of claim 1 wherein said cathode member is a hollow cathode adapted to contain electrolyte within said hollow cathode.

15. The assembly of claim 1 wherein said cathode member is a rigid metal cathode and the metal of said member is one or more of nickel, steel or valve metal member of titanium, tantalum, zirconium, or niobium, or alloy or intermetallic mixture of such metals, including stainless steel.

16. The assembly of claim 1 wherein said electrolyzer has two cells, with a first, lower cell positioned within the bottom portion of said housing member and extending upwardly less than 50 percent of the length of said member, and a second, upper cell positioned above said first cell but spaced apart therefrom.

17. The assembly of claim 16 having a rod element secured to a cylindrical face for each upper cell electrode, with said rod elements extending above the electrode pair, and having a rod element secured to a cylindrical face for each lower cell electrode, with said rod elements depending below said electrode pair.

18. An electrolytic cell electrode adapted for use in a cylindrical electrolyzer, said electrode comprising:

a non-perforate, cylindrical and hollow, rigid metal electrode member having inner and outer cylindrical major faces coated on at least one major face; and an elongate, electrically conductive, rigid metal rod element securely affixed to an electrode major face, said rod element extending in an axial direction along a substantial length of said major face, while also projecting in an axial direction for a substantial length beyond said electrode member.

19. The electrode of claim 18 wherein the metal of said electrode member is one or more of nickel, steel or a valve metal of titanium, tantalum, zirconium, or niobium, as well as their alloys and intermetallic mixtures.

20. The electrode of claim 18 wherein the metal of said electrode member and the metal of said rod element are at least substantially the same.

21. The electrode of claim 18 wherein said rod element is a straight rod element and from about 60 percent to about 80 percent of the length of said rod element extends in an axial direction along said electrode member major face, while projecting in an axial direction for the about 20–40 percent balance of its length beyond said electrode member.

22. The electrode of claim 18 wherein said rod element extends in an axial direction for a distance of from about 30 percent to about 70 percent of the length of said electrode, said rod element has a threaded end beyond said electrode, and a fastening element is secured to said threaded end.

23. The electrode of claim 18 wherein said rod element is secured to the outer cylindrical major face for a cell anode and said rod element is secured to an inner cylindrical major face for a cell cathode.

24. The electrode of claim 18 wherein said electrode member is contained in an electrode assembly of a cylindrical anode and cathode positioned at least substantially coaxial with one another.

25. The electrode of claim 18 wherein said electrode member is coated on less than all of said major face.

26. The electrode of claim 18 wherein said electrode member is an anode and said coating is an electrocatalytic coating.

27. The electrode of claim 26 wherein said electrocatalytic coating contains a platinum group metal, or metal oxide or their mixtures.

28. The anode of claim 27 wherein said electrocatalytic coating contains at least one oxide selected from the group consisting of platinum group metal oxides, magnetite, ferrite, cobalt oxide spinel, and tin oxide, and/or contains a mixed crystal material of at least one oxide of a valve metal and at least one oxide of a platinum group metal, and/or contains one or more of manganese dioxide, lead dioxide, platinate substituent, nickel-nickel oxide or a mixture of nickel plus lanthanum oxides.

29. The method of making a cylindrical electrolyzer assembly having at least one unseparated cell with electrodes provided by a cylindrical anode and cathode pair in said electrolyzer, which method comprises:

establishing an elongate, upright and cylindrical, dielectric electrolyzer housing member having open top and bottom ends;

providing an electrode pair assembly comprising a cylindrical metal cathode member situated in fixed position concentrically inside, and spaced apart from, a cylindrical metal anode member, with each electrode having an elongate electrical connector rigid rod element extending in an axial direction along a substantial length of said electrode member, while also extending in an axial direction beyond said electrode member;

establishing flexible and elongate electrical current conveying means;

coupling said flexible electrical current conveying means to said rigid rod elements of said electrode pair; and enclosing within said housing member said electrode pair assembly and said flexible and elongate electrical current conveying means, positioning said electrode pair assembly therein for projecting said rigid rod elements toward said housing member top end, while substantially extending said current conveying means axially within said housing member.

30. The method of claim 29 further comprising enclosing said top end of said cylindrical housing member with a liquid-tight closing means and inserting said flexible electrical current conveying means through said closing means.

31. The method of claim 30 further comprising establishing apertures in said housing member near said enclosed top end.

32. The method of claim 29 wherein said electrode pair assembly is mechanically secured within such electrolyzer in a position concentric with said cylindrical housing member, while spacing the anode member apart from said housing member.

33. The method of refurbishing an electrolyzer assembly having a cylindrical anode and cathode pair in an elongate cylindrical electrolyzer housing member, said member having a sealed top through which elongate and flexible electrical current carrying means extend and couple with elongate, electrically conductive metal rod elements affixed to, and projecting from, said anode and cathode of the electrode pair, which method comprises:

unsealing said top of said housing member;

removing said housing member from said assembly;

uncoupling said electrical current carrying means from said metal rod elements for each electrode of said anode and cathode pair;

coupling elongate metal rod elements, from a replacement cylindrical anode and cathode pair, to the flexible electrical current carrying means; and replacing said electrolyzer housing member and securing said replacement electrode pair within said housing member; while returning said flexible electrical current carrying means to a position partially extending within said housing member.

34. An electrolytic cell electrode assembly having at least one cylindrical anode and cathode pair adapted for use in an unseparated cell, said assembly comprising:

an upright, cylindrical and hollow metal anode member having a non-perforate side wall, said anode member providing said anode of said anode and cathode pair;

an upright and cylindrical metal cathode member having a non-perforate side wall, which cathode member is the cathode of said anode and cathode pair and which cathode member is situated concentrically within said anode member and spaced apart therefrom, thereby providing an annular electrolyte flow path between said anode and cathode pair;

a perforate electrode holder at each end of said cylindrical anode and cathode pair, each electrode holder firmly positioning said anode and cathode pair in concentric relationship and being firmly pressed against said cylindrical electrode members;

fastening means pressing said electrode holders firmly against said electrode ends; and an elongate and upright electrically conductive rigid rod element for each of said anode and said cathode members and secured to a cylindrical face of each, which rod element extends in an upright, axial direction along at least a substantial length of each electrode member, as well as projects axially beyond each electrode member.

35. The assembly of claim 34 wherein said rod elements extend in an upright direction along at least about 30 to about 70 percent of the length of said electrode members.

36. The assembly of claim 35 wherein said rod elements extend beyond said electrodes for a distance of from about 20 to about 40 percent of the length of said rod elements.

37. The assembly of claim 35 wherein each of said rod elements is a metal element of one or more of steel, nickel or a valve metal of titanium, tantalum, zirconium or niobium, as well as their alloys and intermetallic mixtures, including stainless steel.

38. The assembly of claim 34 wherein said anode member is a rigid metal anode and the metal of said member is a valve metal of one or more of titanium, tantalum, zirconium, niobium, their alloys and intermetallic mixtures.

39. The assembly of claim 34 wherein the cathode member is a rigid metal cathode and the metal of said member is one or more of nickel, steel, their alloys and intermetallic mixtures, including stainless steel.

40. The assembly of claim 35 wherein said anode member has the rod element secured to the outer cylindrical face of said anode and said cathode member has said rod element secured to the inner cylindrical face of said cathode.

41. The assembly of claim 34 wherein said cathode member is a cylindrical and hollow cathode member and said fastening means includes a fastening element extending inside the hollow cathode member between said support plate members.

42. The assembly of claim 34 wherein each of said electrode holders plate members permits passage of electrolyte therethrough.

43. The assembly of claim 34 comprising a top anode and cathode pair and bottom anode and cathode pair, with the top pair being stacked in a coaxial position above said bottom pair, and with a perforate electrode holder positioned in firm engagement between said pairs.

44. An electrode assembly containing first and second cells spaced apart from one another, each comprising a cylindrical anode and cathode, said cells being at least substantially coaxial and adapted for use as unseparated cells wherein electrolyte flows through said cells and from said first cell to said second cell, with each cell in said assembly comprising:

a cylindrical and hollow inner electrode member having a non-perforate side wall providing inner and outer major cylindrical faces, and having an electrolyte flow path through the cylindrical hollow of said member; and a cylindrical and hollow outer electrode member having a non-perforate side wall providing inner and outer major cylindrical faces, which outer electrode member is situated concentrically outside said inner electrode member and spaced apart therefrom, thereby providing an annular electrolyte flow path between electrode members in each cell; and with said assembly further comprising:

an electrolyte flow diverter element situated between said cells, said diverter element having:

a first electrolyte flow channel diverting electrolyte, feeding from the annular electrolyte flow path of said first cell, into the cylindrical hollow electrolyte flow path of said second cell; and a second electrolyte flow channel diverting electrolyte, feeding from the outer major face of said outer electrode member of said first cell, into the annular electrolyte flow path of said second cell.

45. The electrode assembly of claim 44 wherein said inner electrode members are anode members of said cells and said outer electrode members are cathode members.

46. The electrode assembly of claim 44 wherein said electrolyte flow diverter element comprises a member having at least substantially flat top and bottom surfaces, an aperture between said surfaces through the center of said member providing flow of electrolyte through said member, and at least one slot between said surfaces, in addition to said central aperture, said slot also providing flow of electrolyte through said member.

47. The method of electrolyzing an electrolyte with an electrolyzer having first and second cells, each cell having cylindrical and hollow inner and outer electrode members providing an electrolyte flow path through the hollow channel of said inner electrode member, said cells being positioned at least substantially coaxial to one another, but spaced apart from each other and having electrolyte flow between, as well as through, said cells, with the cylindrical electrode members of each cell having inner and outer major cylindrical faces as well as being concentric with one another thereby establishing an annular electrolyte flow path therebetween, which method comprises:

feeding electrolyte to the electrolyte flow path through the hollow channel of said inner electrode member of said first cell, as well as through the annular electrolyte flow path between said concentric electrode members of said first cell;

flowing electrolyte along the outer cylindrical face of said first cell;

channeling the electrolyte feeding from the annular flow path between the concentric electrode members of said first cell to the hollow channel of the inner electrode of said second cell; and channeling electrolyte flow from the outer cylindrical surface of said first cell to the annular flow path of said second cell.

48. The method of claim 47 wherein brine electrolyte is electrolyzed to produce hypochlorite.

49. The method of claim 48 wherein said electrolyte is held in a container and said electrolyzer is operated in a batch mode to produce hypochlorite in said container.

50. The method of claim 48 wherein said electrolyzer is submersed in said electrolyte.

* * * * *